(12) United States Patent
Miedema

(10) Patent No.: US 12,007,795 B2
(45) Date of Patent: Jun. 11, 2024

(54) AUTOMATIC INFLATION MANAGEMENT DEVICE

(71) Applicant: CSE, Inc., Norton Shores, MI (US)

(72) Inventor: Gregory A. Miedema, Spring Lake, MI (US)

(73) Assignee: CSE, Inc., Norton Shores, MI (US)

( * ) Notice: Subject to any disclaimer, the term of this patent is extended or adjusted under 35 U.S.C. 154(b) by 0 days.

(21) Appl. No.: 17/860,646

(22) Filed: Jul. 8, 2022

(65) Prior Publication Data

US 2023/0008400 A1  Jan. 12, 2023

Related U.S. Application Data

(60) Provisional application No. 63/219,451, filed on Jul. 8, 2021.

(51) Int. Cl.
| | |
|---|---|
| *G05D 16/20* | (2006.01) |
| *A47C 27/08* | (2006.01) |
| *A63G 31/12* | (2006.01) |
| *F04D 25/12* | (2006.01) |
| *H02S 30/00* | (2014.01) |

(52) U.S. Cl.
CPC ....... *G05D 16/2066* (2013.01); *A47C 27/082* (2013.01); *A47C 27/083* (2013.01); *A47C 27/084* (2013.01); *A63G 31/12* (2013.01); *F04D 25/12* (2013.01); *H02S 30/00* (2013.01); *Y10T 137/3724* (2015.04)

(58) Field of Classification Search
CPC .......... Y10T 137/3724; G05D 16/2066; F04D 25/12; A47C 27/082; A47C 27/083; A47C 27/084; H02S 30/00; A63G 31/12

USPC .................. 137/231; 441/40, 41; 417/423.14
See application file for complete search history.

(56) References Cited

U.S. PATENT DOCUMENTS

| | | | | |
|---|---|---|---|---|
| 1,667,912 A | * | 5/1928 | Vlahon | ..................... B63C 9/06 |
| | | | | 440/31 |
| 2,719,986 A | * | 10/1955 | Rand | .................. A61G 7/05776 |
| | | | | 128/DIG. 20 |

(Continued)

OTHER PUBLICATIONS

International Search Report and Written Opinion from corresponding Patent Cooperation Treaty (PCT) Application No. PCT/IB22/56351, completed Nov. 15, 2022.

*Primary Examiner* — William M McCalister
(74) *Attorney, Agent, or Firm* — Gardner, Linn, Burkhart & Ondersma LLP

(57) ABSTRACT

An automatic inflator device includes a housing that houses various operational components of the automatic inflator device such as a power source that is electrically coupled to a pump. A coupling portion attached to the housing selectively secures the automatic inflator device to an inflatable object, such as an inflatable watercraft, where the automatic inflator device may remain secured even while the inflatable object remains fully operational, such as while the inflatable object is in use. The pump may be selectively energized to pump air into the inflatable object via a fluid conduit. For example, the pump may be energized or de-energized based on user input or automatically based on a measured pressure of the inflatable object. Optionally, the automatic inflator device may be incorporated into an inlet valve of the inflatable object as the inflatable object is originally manufactured.

20 Claims, 13 Drawing Sheets

(56) References Cited

U.S. PATENT DOCUMENTS

| | | | | |
|---|---|---|---|---|
| 4,114,230 A * | 9/1978 | MacFarland | A47L 7/04 | 15/330 |
| 4,411,287 A * | 10/1983 | Hyde | B67D 1/0838 | 251/149.6 |
| 4,478,587 A * | 10/1984 | Mackal | B63C 9/24 | 137/224 |
| 4,945,851 A * | 8/1990 | Buckle | B63G 8/22 | 251/61.3 |
| 5,006,082 A * | 4/1991 | Hwang | B63C 9/24 | 440/6 |
| 5,113,779 A * | 5/1992 | Amrein | B60F 3/0038 | 440/12.63 |
| 5,230,611 A | 7/1993 | Shelton | | |
| 5,267,363 A * | 12/1993 | Chaffee | F16K 15/148 | 5/713 |
| 5,704,397 A * | 1/1998 | Lu | E03C 1/08 | 74/575 |
| 5,931,207 A * | 8/1999 | Gianino | F04B 35/06 | 417/411 |
| 6,089,251 A * | 7/2000 | Pestel | B63C 9/24 | 137/232 |
| 6,178,911 B1 * | 1/2001 | Hemphill | B63B 7/08 | 114/345 |
| 6,219,861 B1 * | 4/2001 | Chen | E03C 1/23 | 4/689 |
| 6,413,056 B1 * | 7/2002 | Chou | F04D 25/06 | 415/151 |
| 6,530,751 B1 * | 3/2003 | Song | F04D 25/084 | 417/423.1 |
| 7,127,762 B1 * | 10/2006 | Lau | A47C 27/082 | 5/713 |
| 7,373,895 B2 * | 5/2008 | Zeromski | B63B 7/085 | 114/345 |
| 7,387,290 B2 * | 6/2008 | Wang | F16K 1/126 | 251/339 |
| 7,475,443 B2 * | 1/2009 | Wang | H01H 35/245 | 200/82 R |
| 8,011,986 B1 * | 9/2011 | Curtsinger | E04H 15/20 | 441/35 |
| 8,297,309 B2 * | 10/2012 | Wang | F04D 29/5806 | 137/224 |
| 8,382,541 B1 * | 2/2013 | Campbell | B63C 9/04 | 441/40 |
| 8,851,947 B2 * | 10/2014 | Vlock | B63B 32/66 | 441/74 |
| 11,668,310 B2 * | 6/2023 | Huang | A47C 27/10 | 417/242 |
| 2003/0032507 A1 * | 2/2003 | Lacroix | F16K 15/147 | 473/593 |
| 2005/0118046 A1 * | 6/2005 | Wang | F04D 25/084 | 417/423.15 |
| 2006/0108556 A1 * | 5/2006 | Rose | F16K 15/20 | 251/149.8 |
| 2006/0210413 A1 * | 9/2006 | Chung | F04D 25/084 | 417/423.1 |
| 2010/0014993 A1 * | 1/2010 | Wang | F04D 25/084 | 5/713 |
| 2010/0186188 A1 * | 7/2010 | Williams | A47L 5/24 | 15/344 |
| 2010/0247355 A1 * | 9/2010 | Pan | F04D 25/084 | 417/423.14 |
| 2012/0090698 A1 * | 4/2012 | Giori | A47C 27/083 | 137/224 |
| 2013/0059489 A1 | 3/2013 | Mock et al. | | |
| 2015/0135444 A1 | 5/2015 | Spahn et al. | | |
| 2018/0116420 A1 * | 5/2018 | Shakal | H02J 50/12 | |
| 2019/0271322 A1 * | 9/2019 | Huang | F04D 25/12 | |

* cited by examiner

AUTOMATIC INFLATION MANAGEMENT DEVICE

CROSS-REFERENCE TO RELATED APPLICATION

The present application claims priority of U.S. provisional application Ser. No. 63/219,451 filed on Jul. 8, 2021, which is hereby incorporated herein by reference in its entirety.

FIELD OF THE INVENTION

The present invention relates generally to inflator devices and is adapted to be attached to or incorporated into an inlet valve of an inflatable object, and in particular to an inflatable watercraft such as an inflatable boat or paddleboard.

BACKGROUND OF THE INVENTION

Inflatable objects are commonly used in the form of inflatable boats, inflatable stand-up paddle boards, rafts, tubes, etc. When use of the inflatable object is desired, air must be moved from the external environment into the interior of the inflatable object through an inlet valve attached to the inflatable object. An electric or manual pump or compressor may be used to pump air into the inflatable object via the inlet valve.

SUMMARY OF THE INVENTION

The automatic inflator device of the present invention is adapted to be coupled to an inlet valve assembly of an inflatable object, such as an inflatable boat or inflatable stand-up paddleboard, to inflate and/or manage inflation of the inflatable object. If desired, the device may remain attached to the inflatable object while remaining fully operational, even while the inflatable object is in use. A housing includes a top cover that is attached to a lower base, and houses various operational components of the automatic inflator device including a power source or power supply, a pump, a control board or controller, and a pressure device, which may be configured as a pressure sensor and/or a pressure switch. A coupling portion is attached to a lower surface of the base, and can be secured to the inlet valve assembly of the inflatable object. Once the coupling portion is secured to the inlet valve assembly, the pump may be energized or activated to pump air into the inflatable object to manage inflation of the inflatable object. After a desired inflation level is reached, the pump may be de-energized or deactivated. The pump may be automatically re-energized to pump additional air into the inflatable object if a sufficiently low internal pressure of the inflatable object is measured or detected by the pressure device. Additionally, a pressure relief valve may release air from the inflatable object as desired. Accordingly, the automatic inflator device is able to manage the internal air pressure of the inflatable object.

According to one form of the present invention, an automatic inflator device includes a housing that houses a power source and a pump. A coupling portion is attached to the housing and is attachable to an inflatable object. A fluid conduit is fluidly connected to the pump and operably coupled to an internal volume of the inflatable object when the coupling portion is attached to the inflatable object. The power source is electrically coupled to the pump and can be controlled to energize the pump to move air through the fluid conduit into the inflatable object.

In one aspect, the power source includes a solar panel that is electrically coupled to a rechargeable battery. Optionally, the housing may include a solar permeable panel that overlies the solar panel.

In another aspect, the automatic inflator device includes a control board that may receive and execute commands from a user to selectively energize and de-energize the pump.

In a yet another aspect, the automatic inflator device has a pressure device that may energize and de-energize the pump based on an internal air pressure of the inflatable object. Optionally, the pressure device may be a pressure sensor that converts a measured internal air pressure of the inflatable object into an electrical signal that may be read by the control board to energize and de-energize the pump. Additionally, the control board may wirelessly transmit the measured internal air pressure of the inflatable object to a remote electronic device, such as a user's mobile phone, tablet, or a computer.

In still another aspect, the automatic inflator device may include a pressure relief mechanism that reduces the internal air pressure of the inflatable object when the inflatable object is overinflated. Optionally, air may enter and exit the housing through a valve, such as an air permeable water barrier that also prohibits water from entering the housing.

According to another form of the present invention, an automatic inflator device that is integrated into an inflatable object includes a waterproof housing that houses a power source that is electrically coupled to a pump. A coupling portion is attached to a lower surface of the housing and to the inflatable object operably connects the pump to the inflatable object. The power source may selectively energize the pump to inflate the inflatable object.

In one aspect, the automatic inflator device includes a control board that is electrically coupled to the power source and the pump. The control board may selectively energize and de-energize the pump based on input received from a user. Optionally, the control board may include a global positioning system (GPS) device, in which the control board may wirelessly transmit its location to a remote electronic device.

According to yet another form of the invention, an automatic inflator device for inflating and/or managing inflation of an inflatable object includes a waterproof and buoyant housing that has a solar permeable panel. The housing houses a solar panel that underlies the solar permeable panel, a pump, a rechargeable battery that is electrically coupled to the solar panel and the pump, and a fluid conduit that is fluidly connected to the pump. A coupling portion connected to the housing includes a nozzle having an upper end located within the housing and a lower end located outside of the housing. The upper end of the nozzle is fluidly connected to the fluid conduit. A valve adaptor may be secured to the coupling portion and to an inlet valve assembly of the inflatable object. The lower end of the nozzle becomes fluidly connected with the valve adaptor when the valve adaptor is secured to the coupling portion. The valve adaptor also becomes fluidly connected with an internal volume of the inflatable object to fluidly connect the pump to the internal volume of the inflatable object when the valve adaptor is secured to the inlet valve assembly of the inflatable object. The rechargeable battery may energize the pump to move air through the fluid conduit, the nozzle, the valve adaptor, and into the internal volume of the inflatable object in order to inflate the inflatable object. Optionally, the valve adaptor may be a cone-shaped valve adaptor, and the coupling portion may include a threaded collar to which the valve adaptor may be connected via threads defined on the valve adaptor. Additionally, a valve comprising an air permeable water barrier may be located within the coupling portion to allow air to enter and exit the housing, but that also prohibits water from entering the housing.

These and other objects, advantages, purposes and features of the present invention will become apparent upon review of the following specification in conjunction with the drawings.

DETAILED DESCRIPTION OF THE PREFERRED EMBODIMENTS

Figure 6:
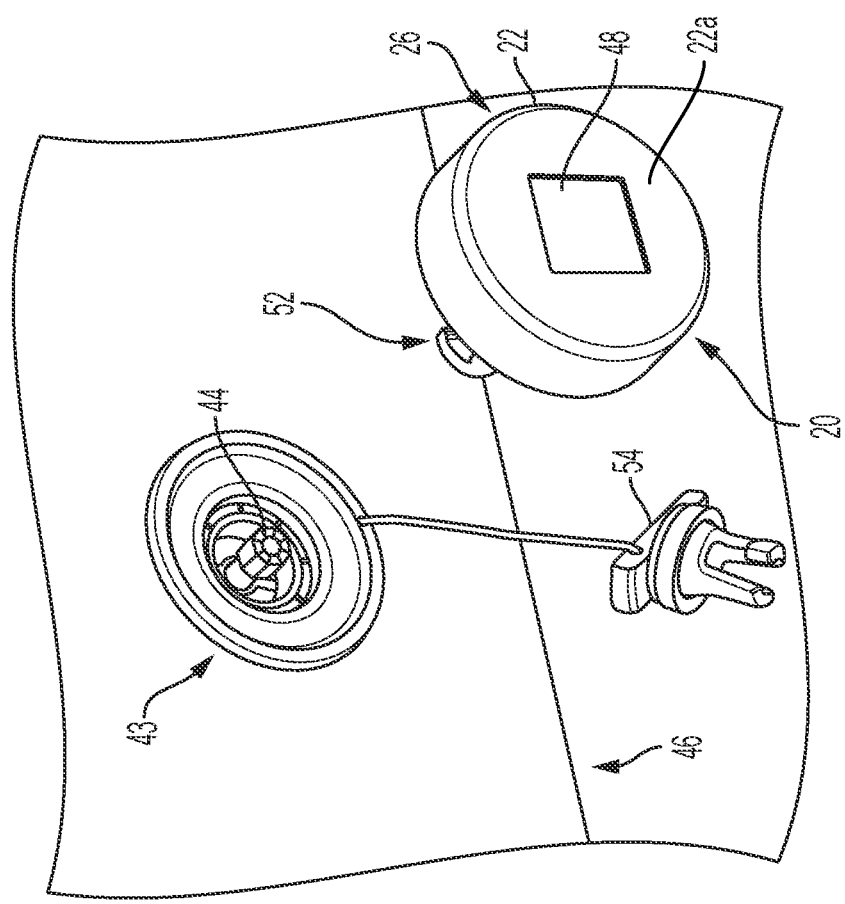
FIG. 6 is a perspective view of the automatic inflator device of FIG. 1 shown in arrangement for attachment to an inflatable watercraft.
Figure 7:
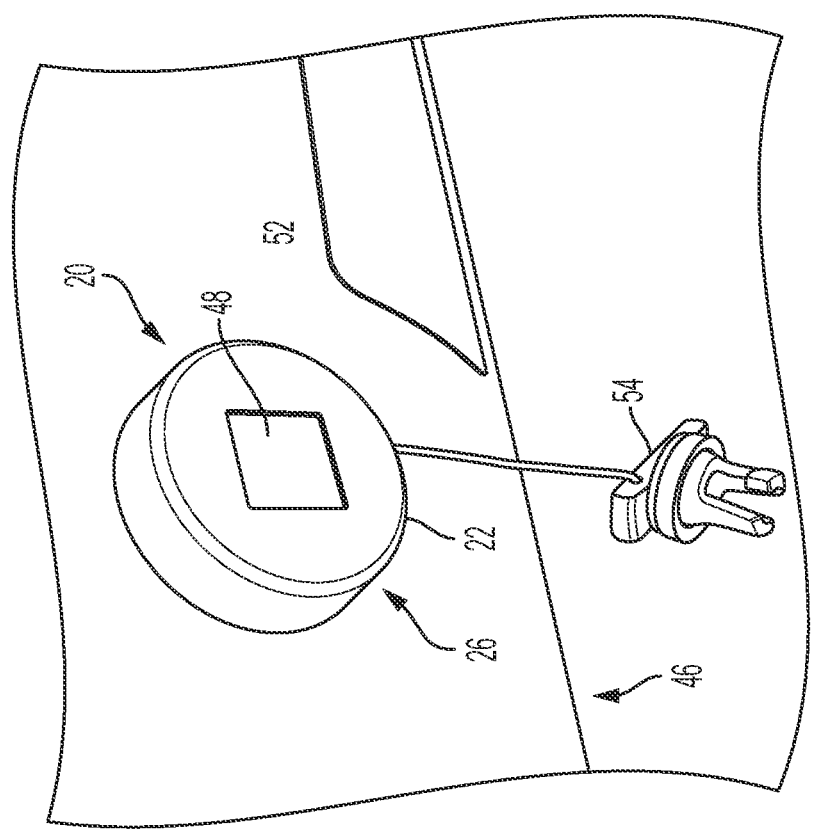
FIG. 7 is another perspective view of the automatic inflator device of FIG. 1 shown attached to the inlet valve assembly of the inflatable watercraft of FIG. 6.
Figure 9:
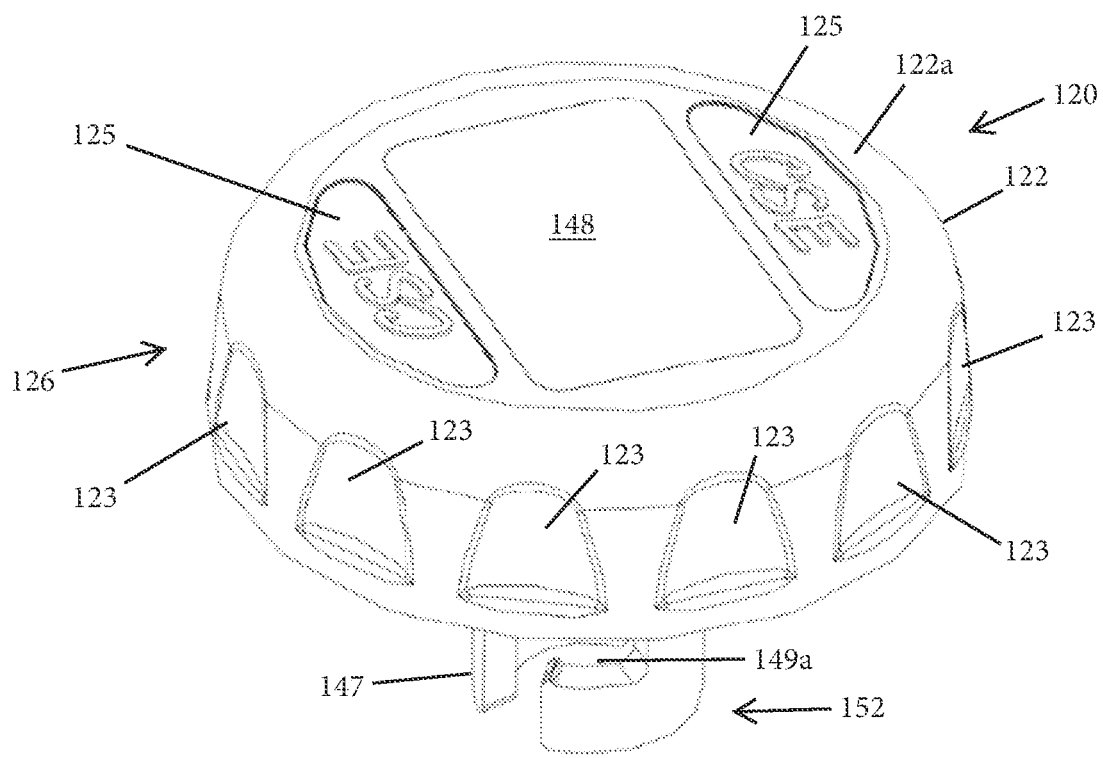
FIG. 9 is a perspective view of another automatic inflator device in accordance with the present invention, in which the automatic inflator device includes gripping features, air permeable water barriers, and an alternative base having an alternative coupling portion.
Figure 10:
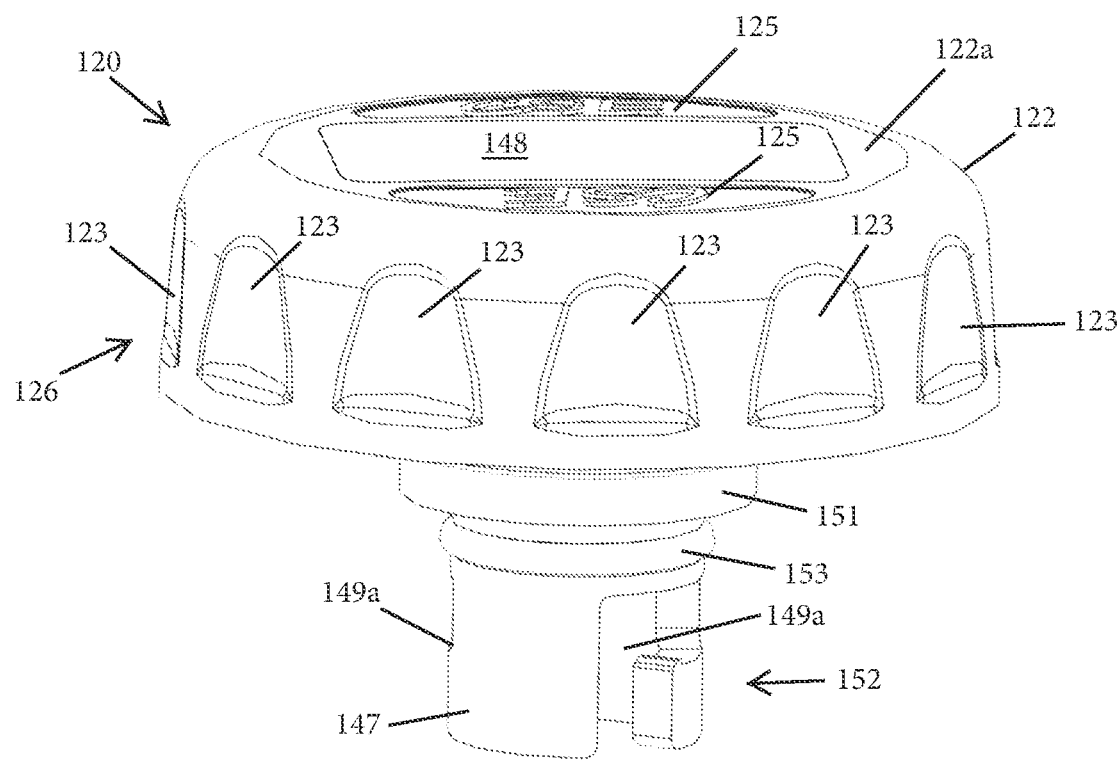
FIG. 10 is a side perspective view of the automatic inflator device of FIG. 9.
Figure 11:
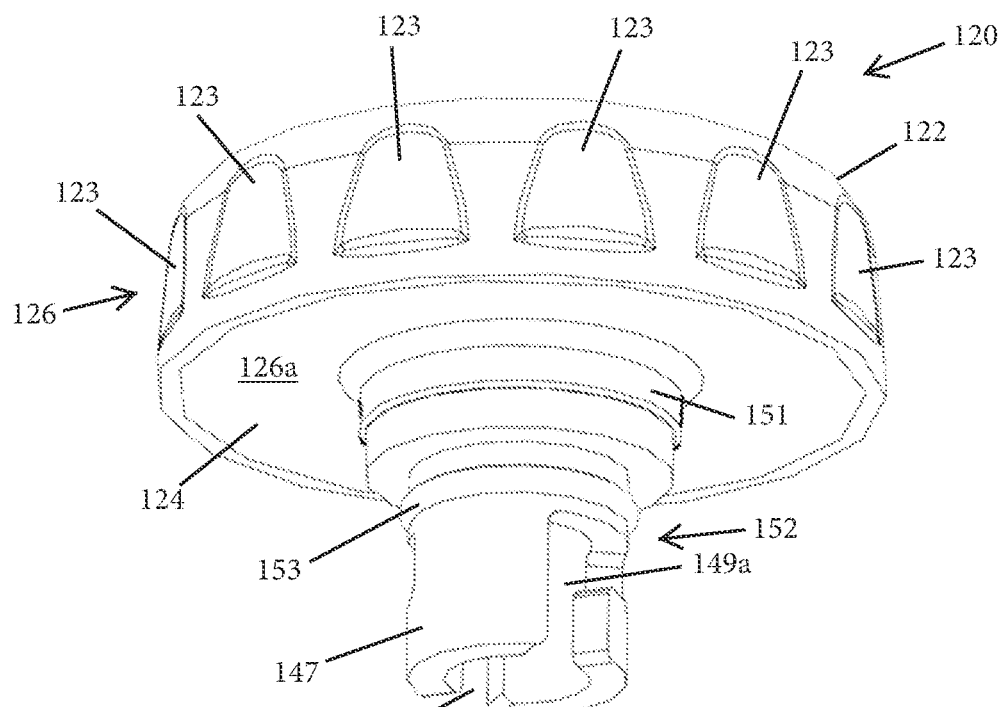
FIG. 11 is a lower perspective view of the automatic inflator device of FIG. 9.
Figure 12:
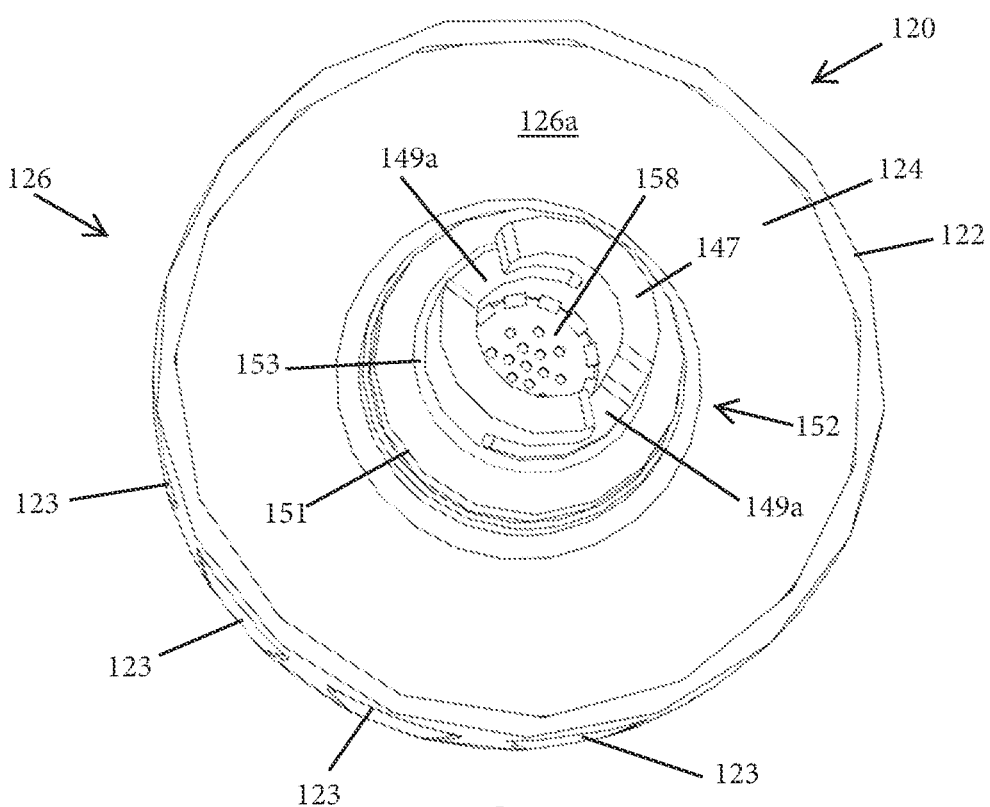
FIG. 12 is a bottom perspective view of the automatic inflator device of FIG. 9.
Figure 13:
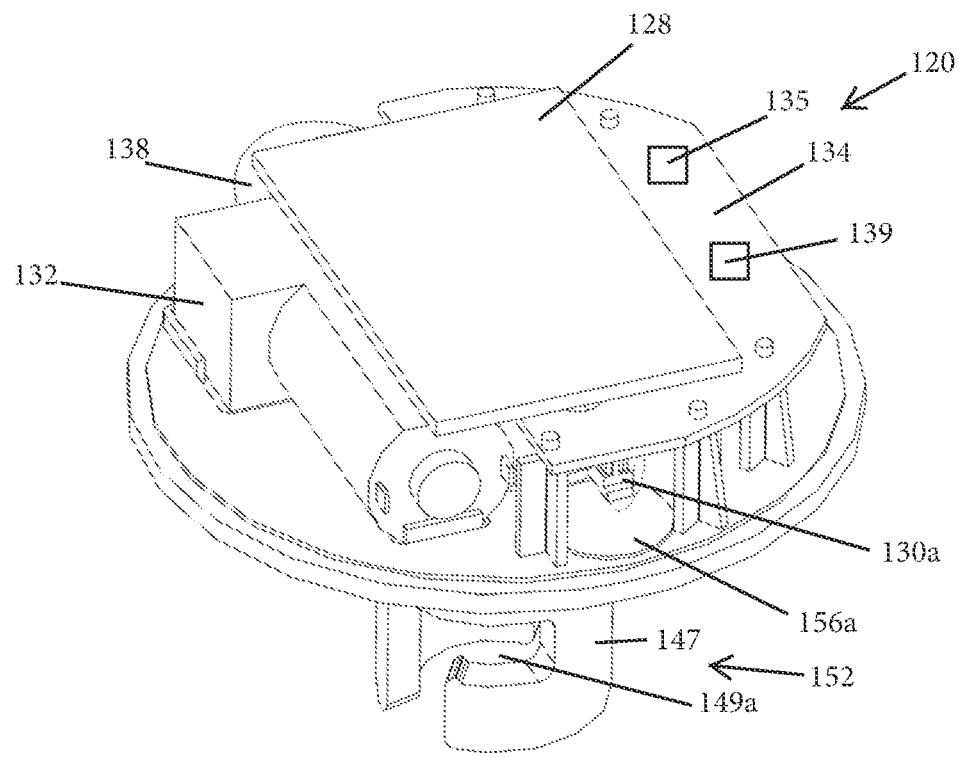
FIG. 13 is a perspective view of the automatic inflator device of FIG. 9, in which a top cover has been removed.
Figure 14:
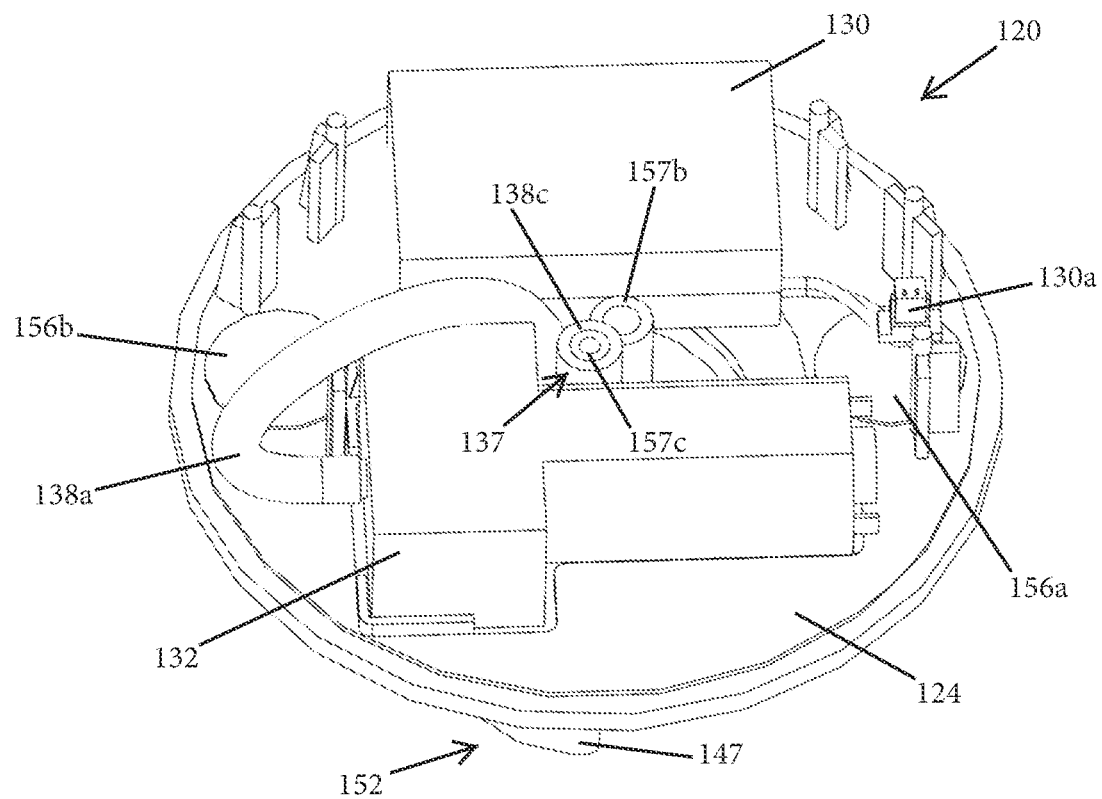
FIG. 14 is a rotated perspective view of the automatic inflator device of FIG. 13, in which a control board and a solar panel have been removed to reveal additional components.
Figure 15:
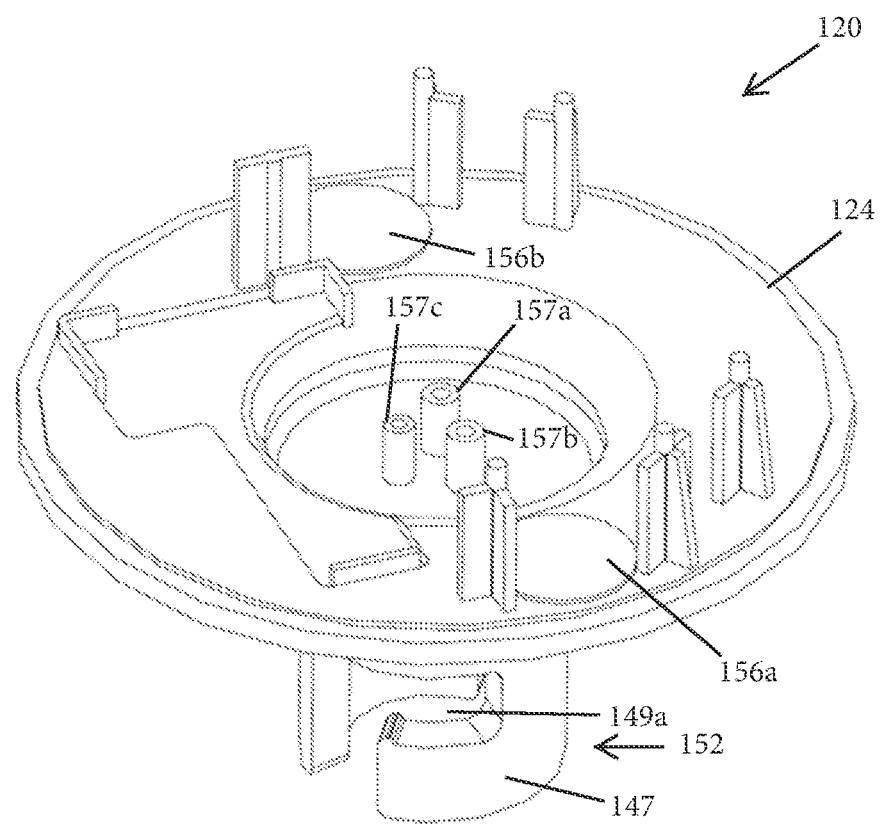
FIG. 15 is a rotated perspective view of the automatic inflator device of FIG. 14, in which a pump, a rechargeable battery, and a fluid conduit have been removed to reveal additional components.

The present invention will now be described with reference to the accompanying figures, wherein the numbered elements in the following written description correspond to like-numbered elements in the figures. As shown in the illustrated embodiment of FIGS. 1-4, an automatic inflator device or automatic pump assembly 20 includes a top cover 22 and a base 24 that form a housing 26. Housing 26 houses various operational components including a solar panel 28, a rechargeable battery 30, a pump 32, a controller or control board 34, a pressure sensor 36, and a fluid conduit 38. Housing 26 includes a coupler or coupling portion 52, which in the illustrated embodiment comprises a threaded collar 40 at base 24 disposed on a lower side 26a of housing 26, whereby inflator 20 may be secured via coupling portion 52 directly to an inlet valve assembly 43 and/or inlet valve 44 of an inflatable object, such as inflatable watercraft 46 (FIGS. 6 and 7). Alternatively, threaded collar 40 can also be quickly and easily coupled to various types of valve adaptors, such as valve adaptors 42a-c (FIGS. 5A-5C), which may alternatively be secured to the inlet valve assembly 43 and/or inlet valve 44 of inflatable watercraft 46. Inflator 20 may thus be secured to a watercraft in various manners depending on the specific construction and arrangement of the watercraft and associated inlet valve assembly and/or inlet valve. After coupling portion 52 is secured to inflatable watercraft 46, the automatic inflator device 20 may be activated to inflate inflatable watercraft 46. Optionally, automatic inflator device 20 may remain attached to an inflatable object, including while the inflatable object is in use, and/or may be fully incorporated into an inlet valve assembly when the inflatable object is originally manufactured. When originally manufactured into an inflatable object, automatic inflator device 20 may replace a valve cap and be used to inflate and/or maintain an optimal air pressure within the inflatable object by pumping air into the inflatable object as may be periodically required to manage a desired internal air pressure, such as by monitoring and controlling the air pressure, while forming a water tight or waterproof seal with the watercraft. It should be appreciated that automatic inflator devices configured to be manufactured into an inflatable object may be constructed to have an alternatively configured coupling portion depending on the configuration of the inflatable object. For example, the inflator device may be configured to have a coupling portion with external threads for insertion into a receiving body on an inflatable object.

Figure 2:
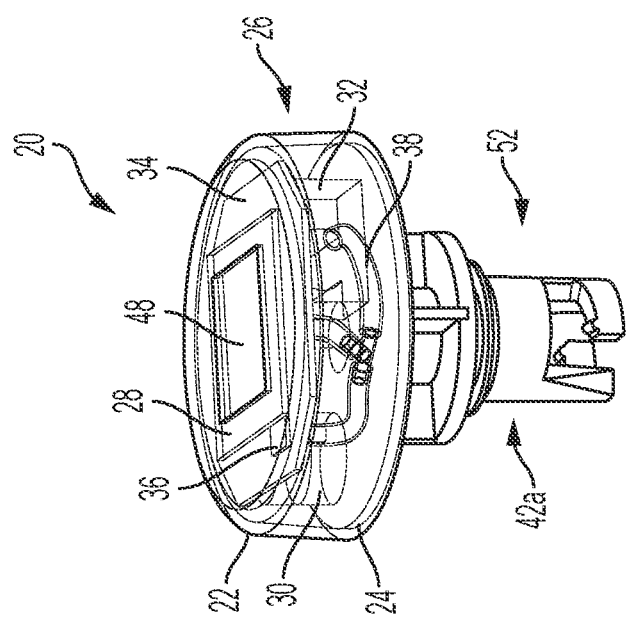
FIG. 2 is another perspective view of the automatic inflator device of FIG. 1 in which a housing is illustrated as transparent to reveal internal components.
Figure 1:
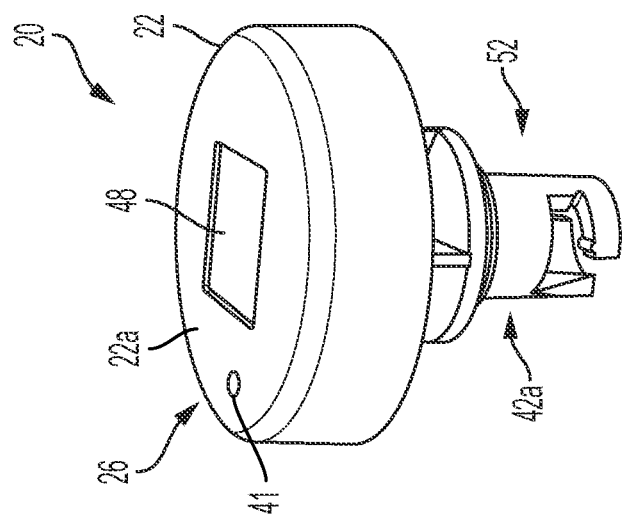
FIG. 1 is a perspective view of an automatic inflator device in accordance with the present invention.

Referring now to the illustrated embodiment of FIG. 1, automatic inflator device 20 includes top cover 22 attached to base 24 to form housing 26 having a waterproof internal volume. That is, water is inhibited or prevented from entering into the internal volume of housing 26. The attachment of top cover 22 to base 24 also results in automatic inflator device 20 being buoyant. Top cover 22 may be attached to base 24 in a variety of ways, including by threading top cover 22 to base 24, in which case top cover 24 may then be sealed in a manner so as to prevent water ingress into housing 26, such as by providing a silicone sealant or other waterproof or water-tight seal between top cover 22 and base 24. Alternatively, top cover 22 may be welded to base 24, or top cover 22 could be secured to base 24 via frictional engagement such as via a press-fit or snap-on type connection in which a sealing member such as a gasket and/or an O-ring or other form of seal may be disposed between top cover 22 and base 24 to form waterproof housing 26. In the illustrated embodiment of FIG. 2, an opening or a solar permeable panel 48 at an upper surface 22a of top cover 22 permits sunlight to come into contact with and energize a power collection source in the form of solar panel 28, which is mounted or operatively coupled to control board 34 within housing 26. Solar panel 28 is electrically connected to a power source, such as rechargeable batteries 30, which are also contained within housing 26. As understood from the illustrated embodiment of FIG. 3, rechargeable batteries 30 are electrically connected to control board 34 and are operable to power pump 32 and provide power to pressure sensor 36, where sensor 36 may additionally be electrically coupled to control board 34. It should be appreciated that the power system described above may vary within the scope of the present invention, and may be powered via alternative methods and/or include various other types of energy collection and energy storage/transfer devices, such as a power cord plug in power connection, an inductive coupler and/or some other power supply and a rechargeable battery, capacitors and/or some other form of energy storage. For example, an automatic inflator device may not have a solar panel, and instead may be energized through battery power only, or may not include batteries. An automatic inflator device may further include a charging port that allows a user to recharge a battery of the automatic inflator device via an electrical outlet. In another alternative form of an automatic inflator device, electrically-depleted batteries may be quickly and easily interchanged with electrically-charged batteries. As noted, an automatic inflator device may include various other types of energy collection and energy storage/transfer devices, such as capacitors and/or inductive couplers.

Figure 3:
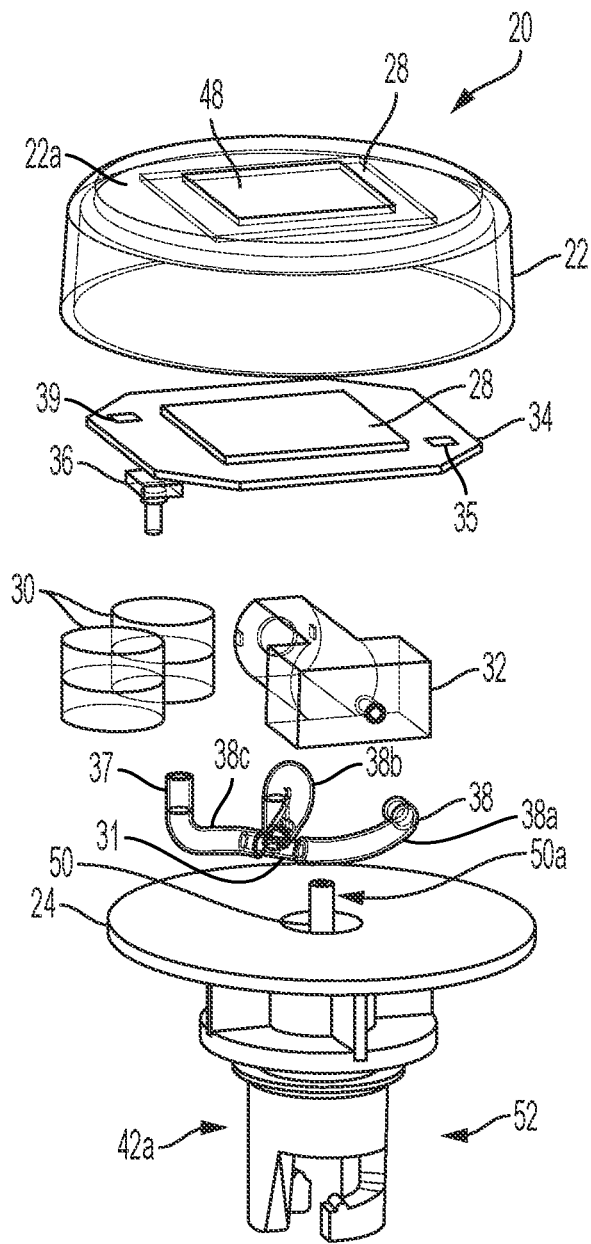
FIG. 3 is an exploded view of the automatic inflator device of FIG. 1.

Referring again to the illustrated embodiment of FIG. 3, when energized by batteries 30, pump 32 is adapted to pump air from the external environment into an inflatable object, such as watercraft 46 (FIGS. 6 and 7) or numerous other types of inflatable devices. For example, automatic inflator device 20 could be used to inflate an inflatable boat, an inflatable stand-up paddleboard, an inflatable raft, or an inflatable tube. Pump 32, which in the illustrated embodiment is configured as a micro pump for pumping air. Pump 32 draws ambient air, such as via a port or valve in housing 26 for pumping into watercraft 46, where the port or valve may be configured to allow air to enter pump 32 but prevent water from entering pump 32, such as via a check valve, or vent or moisture trap, or the like. Pump 32 is operably and/or fluidly connected to conduit 38, which in the illustrated embodiment comprises a tube. However, it should be understood that a fluid conduit may take many alternative forms, such as a pipe, a passageway or channel defined at least in part by other components of an automatic inflator device, and/or any other suitable form to guide or direct the flow or movement of a fluid such as air from a pump into an inflatable object. In addition to being operably connected to pump 32, conduit 38 is fluidly connected to pressure sensor 36 and an upper end 50a of a nozzle 50 that passes through base 24. In the illustrated embodiment conduit 38 comprises three lines or tubes 38a, 38b, 38c that are connected by a T-connector 31. Line 38a extends from pump 32 to connector 31, line 38b extends from connector 31 to upper end 50a of nozzle 50, and line 38c extends from pressure sensor 36 to connector 31. It should be appreciated that numerous other types of arrangements for conduit 38 may be employed within the scope of the present invention.

Figure 4:
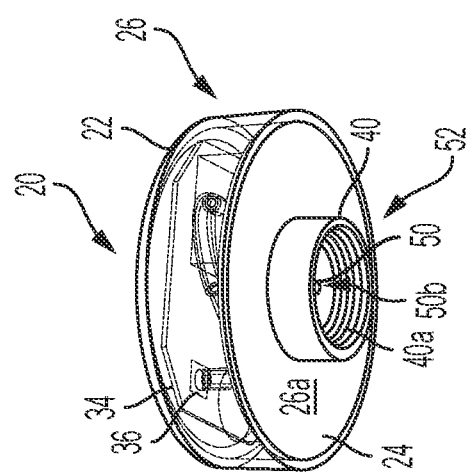
FIG. 4 is a lower perspective view of a coupling portion attached to the housing of the automatic inflator device of FIG. 1.

As shown in the illustrated embodiment of FIG. 4, nozzle 50 defines a fluid pathway through base 24 that terminates in a lower end 50b located within coupling portion 52. Lower end 50b of nozzle 50 is adapted to be coupled to an inlet valve assembly 43 or may be coupled to a valve adaptor, such as small cylindrical valve adaptor 42a (FIG. 5A), large cylindrical valve adaptor 42b (FIG. 5B), cone-shaped valve adaptor 42c (FIG. 5C), a valve adaptor that couples to an inlet valve via threads, or any other type of valve adaptor that may be used to operably couple automatic inflator device 20 to an inlet valve and/or inlet valve assembly of an inflatable object. Accordingly, once automatic inflator device 20 is secured to an inflatable object, both pump 32 and pressure sensor 36 will be operably and/or fluidly connected to the interior or the inflatable object via nozzle 50 and conduit 38. It should be understood that a fluid pathway that fluidly connects a pump and/or pressure device of an automatic inflator device to an inlet valve of an inflatable object may be defined by or otherwise incorporated into a coupling portion without the need of a nozzle. Furthermore, a fluid conduit, such as conduit 38, may be considered to be a part of a fluid pathway and vice versa.

As previously noted, coupling portion 52 may be secured to inlet valve assembly 43 and/or inlet valve 44 of an inflatable object with or without a valve adaptor. For example, in the illustrated embodiment coupling portion 52 includes a threaded portion in the form of an internally threaded collar 40 (FIG. 4) that may be secured directly to external receiving threads located on inlet valve assembly 43. A coupling portion may additionally or alternatively include a threaded portion having external threads securable to an inlet valve assembly having internal threads and/or a nut. Furthermore, a coupling portion may be permanently affixed to an inflatable object, for example, by an adhesive, one or more fasteners, and/or in another fashion appropriate to enable an automatic inflator device remain secured to and properly inflate an inflatable object, even while the inflatable object is being used/operated.

Threaded collar 40 may also be secured to valve adaptors 42a-c (FIGS. 5A-5C) by threading the external threads located on valve adaptors 42a-c into the internal receiving threads on threaded collar 40. It should be understood that a coupler or coupling portion of an automatic inflator device may solely include threaded collar 40, or may include threaded collar 40 and a secondary attachment such as a valve adaptor, or may include a different structure that is necessary to couple the automatic inflator device to an inlet valve of an inflatable object. In the illustrated embodiment, valve adaptors 42a-42c define through passages and have external threads 45a-45c for connecting with the internal threads of collar 40. Adaptor 42a has a cylindrical insertion end 47a that includes a pair of opposed slotted connectors 49a, where insertion end 47a is configured to be inserted into an inlet valve assembly and rotated to engage with corresponding portions on the inlet valve assembly. Adapter 42b includes a cylindrical insertion end 47b that is configured to mate with and form a press fit connection into an inlet valve assembly. Likewise, adapter 42c includes a conical insertion end 47c for mating with a correspondingly configured inlet valve assembly.

Figure 5C:
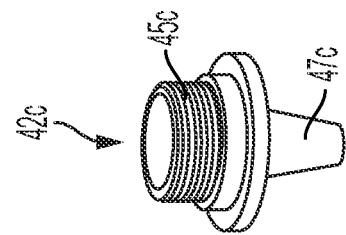
FIG. 5C is a perspective view of still another embodiment of a valve adaptor.

Referring again to the illustrated embodiments depicted in FIGS. 4-5C, an air pathway through the interior of a valve adaptor becomes connected with lower end 50b of nozzle 50 if a user has secured the valve adaptor, for example, valve adaptors 42a-c, to coupling portion 52 as described above.

The user may then couple the valve adaptor to the inlet valve on the inflatable object, thereby coupling automatic inflator device 20 to the inflatable object and also connecting pump 32 and pressure sensor 36 to the interior of the inflatable object. Once automatic inflator device 20 is properly connected to the inflatable object, as described above, pump 32 may be energized by batteries 30 to pump air from the external environment into the inflatable object, thereby causing the inflatable object to inflate by increasing the air pressure within the interior of the inflatable object.

Figure 8:
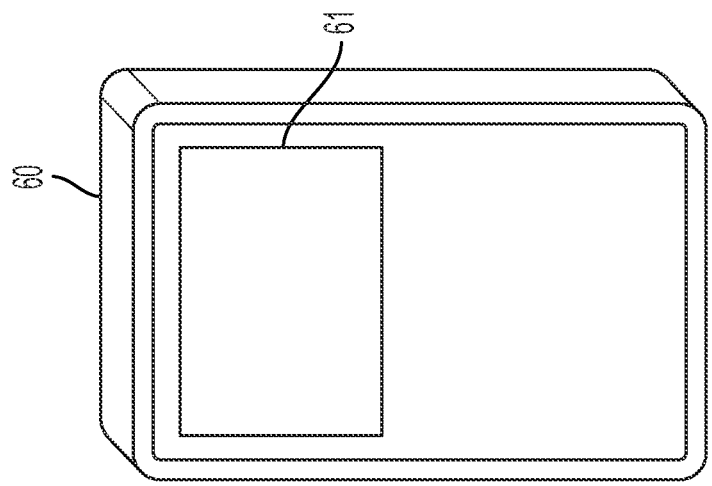
FIG. 8 is a perspective view of a mobile electronic device.

A pressure device configured as a pressure sensor 36 transmits an electrical signal to control board 34 based on the measured or detected air pressure within the inflatable object, where control board 34 may include a processor or microprocessor 35, as well as additional hardware and/or circuitry and include software for controlling operation of inflator 20. Based on the measured or detected air pressure, control board 34 can selectively energize or de-energize pump 32 to initiate or discontinue the inflating process. This allows automatic inflator device 20 to maintain a desired internal air pressure within the inflatable object, or to prevent over-inflation of the inflatable object. Optionally, an alarm such as an audible noise, a warning on a connected display, or an alert sent to a remote electronic device such as a mobile phone (FIG. 8) or computer, may notify a user to a condition of over-inflation or under-inflation within the inflatable object that automatic inflator device 20 is connected to. It will be appreciated that a pressure switch could also be used in place of or in addition to pressure sensor 36 to automatically energize or de-energize pump 32 to initiate or discontinue the inflating process. Such pressure control devices as the noted pressure sensor and pressure switch may thus comprise a pressure controller. Furthermore, a pressure relief mechanism, such as a relief valve 37 (FIG. 3) that may be actuated and/or opened in response to an elevated pressure or an electronic command, such as a command from control board 34, may be incorporated into an automatic inflator device to reduce the internal air pressure of an inflatable object if the inflatable object is in an overinflated condition or otherwise at a higher inflation pressure than is desired by a user.

As understood from FIG. 7, a user can also use a portable electronic computer device 60, such as a smart phone, tablet computer, laptop or the like, having a software application 61 to remotely adjust, set, and otherwise control the desired pressure levels and pressure limits programmed into control board 34, such as via a wireless Internet or Bluetooth, or other such connection. Through the application 61, the user may also separately customize the level of inflation and alarm limits of a number of automatic inflator devices independent of one another. Additionally, a user may use the application 61 to access an online database that stores data from various automatic inflator devices. This data could include recorded activities such as when pump 32 was energized or de-energized, when the device 20 was connected or disconnected to an inlet valve, the past or current location of the device 20, as well as other data. For example, the location of device 20 may be monitored via a global positioning system (GPS) system circuit or chip 39 electrically connected to or incorporated with control board 34. A user may also view historic pressure data relating to the inflatable object that device 20 is attached to. Furthermore, in some embodiments an emergency position indicating radio beacon (EPIRB) may be incorporated into an automatic inflator device.

Pump 32 may be selectively energized by batteries 30 in a number of ways. In one method of energizing pump 32, a user manually operates a physical and/or digital control, such as a button, dial, switch, or touch screen display that is attached to automatic inflator device 20, such as shown at 41 in FIG. 1. In another method, pump 32 could be energized remotely by a user via an electronic device 60 such as a mobile phone or computer that communicates wirelessly via Wi-Fi, BLUETOOTH®, cellular data, or the like, with control board 34. In this method, control board 34 executes a user command after it is wirelessly received. Additionally, as described above, pump 32 could be energized automatically to maintain a desired internal air pressure of an inflatable object, without the need of a user, based on the measured or detected internal air pressure of the inflatable object that automatic inflator device 20 is connected to. It should be appreciated that certain embodiments of an automatic inflator device may include a display screen that displays information such as the current measured internal pressure of an inflatable object, the current user settings, the battery level, etc.

Figure 5B:
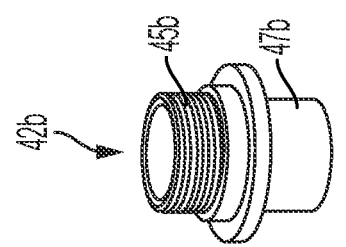
FIG. 5B is a perspective view of another embodiment of a valve adaptor.
Figure 5A:
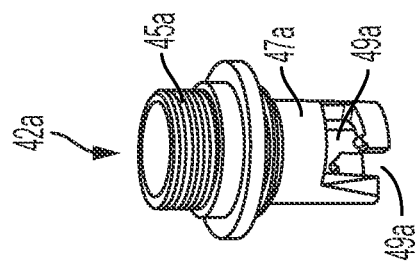
FIG. 5A is a perspective view of an embodiment of a valve adaptor for use with the automatic inflator.

As discussed, automatic inflator device 20 may be selectively attached to a variety of different inlet valves via a variety of different coupling portions that may include valve adaptors, such as valve adaptors 42a-c shown in FIGS. 5A-5C. Alternatively, automatic inflator device 20 may also be integrated into the inlet valve design of an inflatable object such that it replaces all or some portion of inlet valve 44 and/or inlet valve assembly 43 (FIG. 6) and/or a valve cap, such as valve cap 54. In this case, the original manufacture of the inflatable object could include automatic inflator device 20 as a component of the overall inflatable object, including as a replacement of or in addition to an inlet valve and/or a valve cap.

Referring now to the illustrated embodiment of FIGS. 9-12, another automatic inflator device 120 is shown that is similar to automatic inflator device 20, with similar features of automatic inflator device 120 relative to automatic inflator device 20 being designated with like reference numbers, but with "100" added to each reference number of automatic inflator device 120. Due to the similarities of automatic inflator device 120 relative to automatic inflator device 20, not all of the components and features of automatic inflator device 120 are discussed herein. As shown, automatic inflator device 120 has a top cover 122 that may be connected to a base 124 to form a housing 126. Top cover 122 includes indentations or gripping features 123 that enable a user to better grasp and manipulate automatic inflator device 120, such as when the user may be twisting, screwing, or otherwise connecting automatic inflator device 120 to an inlet valve assembly of an inflatable object. Top cover 122 may also be formed with various ornamental features, letters, words, numbers, and/or symbols, for example, to form logos 125.

Figure 16:
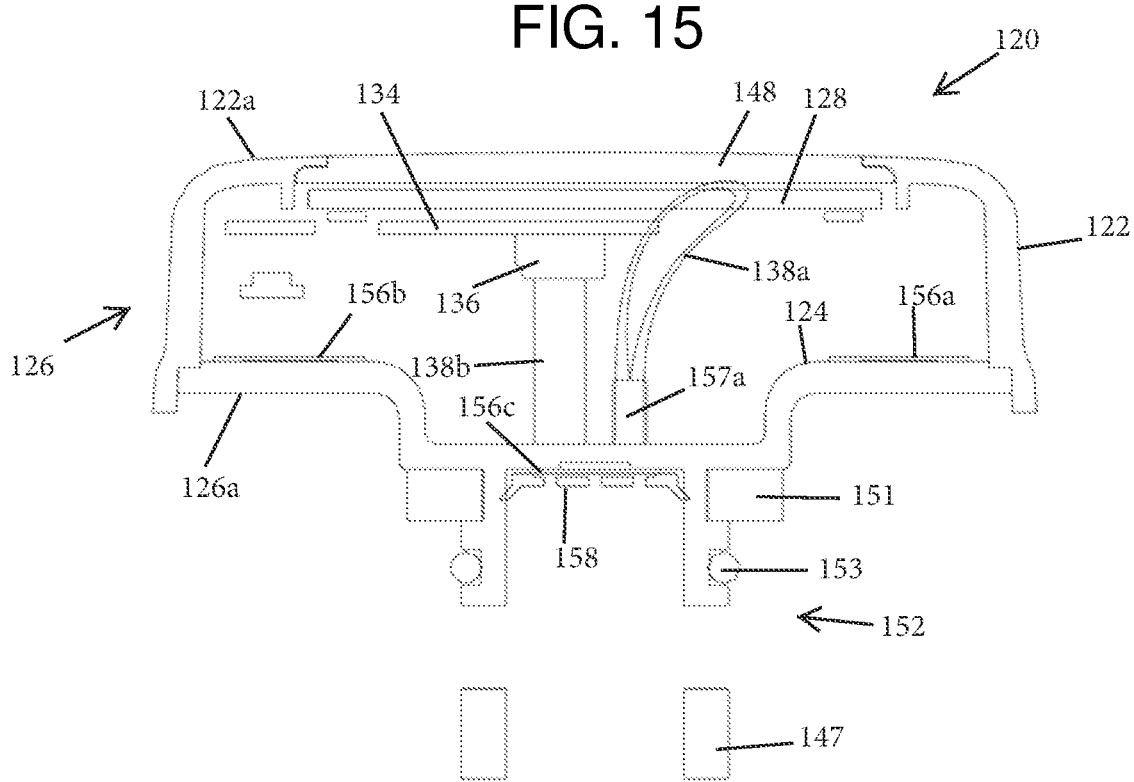
FIG. 16 is a cross sectional view of the automatic inflator device of FIG. 9, taken along a center plane of the automatic inflator device.
Figure 17A:
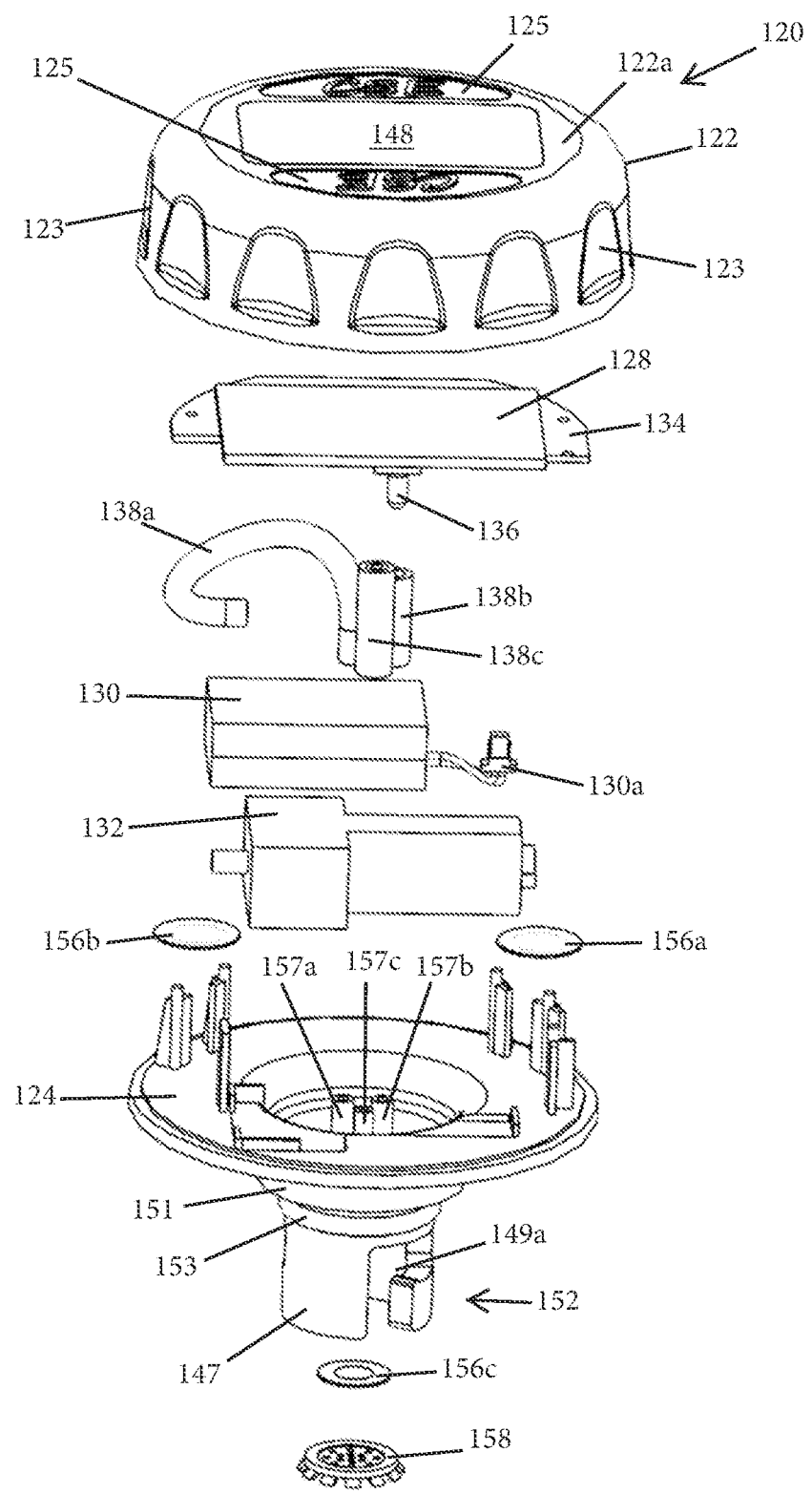
FIG. 17A is an upper perspective exploded view of the automatic inflator device of FIG. 9.
Figure 17B:
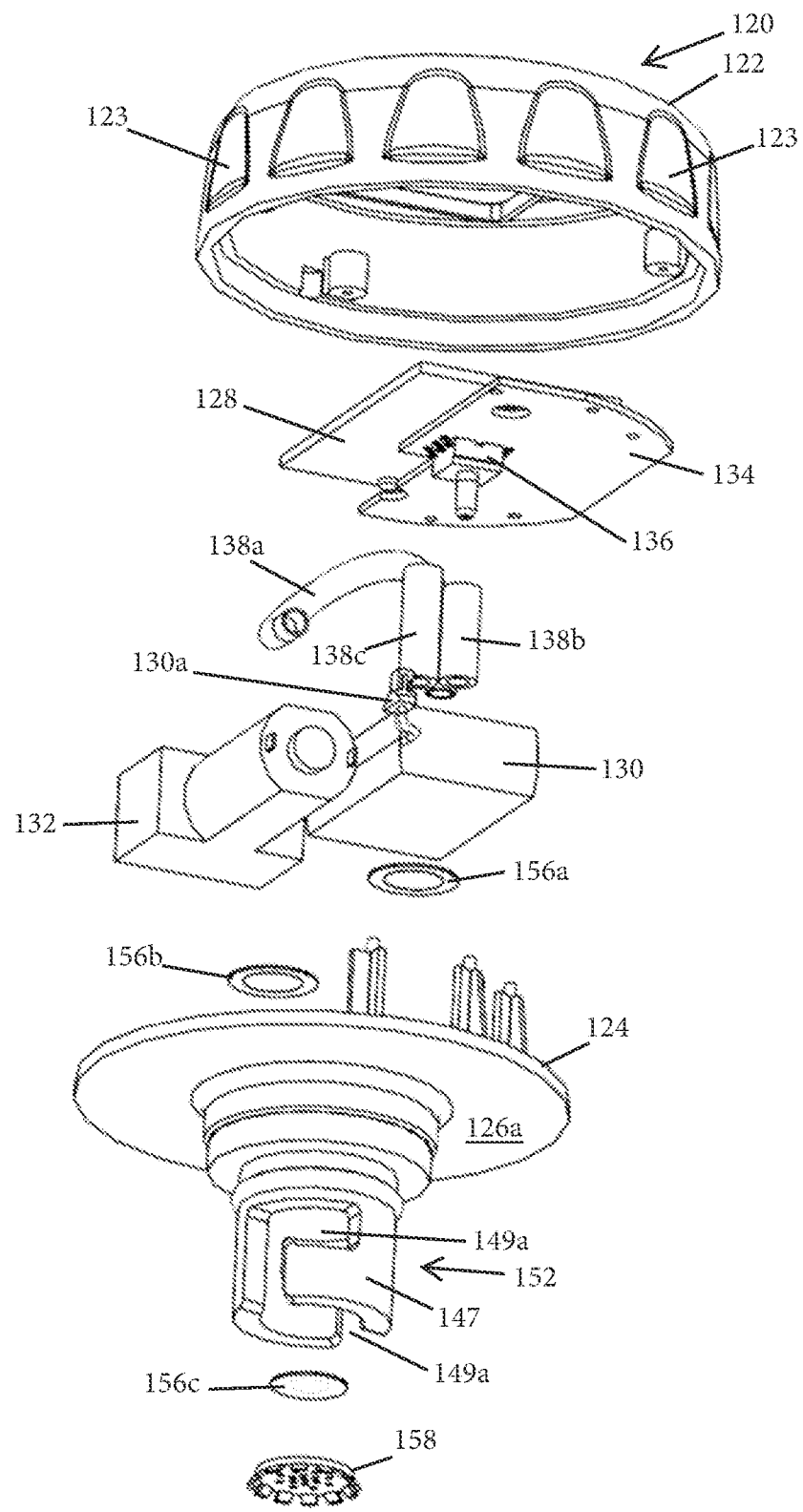
FIG. 17B is a lower perspective exploded view of the automatic inflator device of FIG. 9.

Automatic inflator device 120 includes a base 124 having a coupling portion 152 configured to mate with a HALKEY-ROBERTS® valve, which is manufactured by Halkey-Roberts Corporation of Saint Petersburg, Florida Coupling portion 152 has a cylindrical insertion end 147 that includes a pair of opposed slotted connectors 149a, where insertion end 147 is configured to be inserted into the inlet valve assembly and rotated to engage with corresponding portions on the inlet valve assembly. With further reference to FIG. 16, coupling portion 152 further includes a primary sealing member or primary gasket 151 that is spaced-apart from a secondary sealing member or secondary gasket 153. Primary and secondary gaskets 151, 153 cooperate to form a water and air-tight connection when coupling portion 152 is coupled to the inlet valve assembly, with, for example, seal 153 sealing to an inner diameter of an inlet valve assembly and seal 151 sealing against a surface or end of an inlet valve assembly.

Referring now to FIGS. 13-15 and 17A-17B, housing 126 has a pump 132 that is electrically connected to a solar panel 128, a battery 130, a control board 134, and a pressure sensor 136. Battery 130 has an electrical connector 130a that may be connected to an electrical receiver on control board 134. Solar panel 128 is also electrically connected to control board 134 to allow circuitry on control board 134 to control and/or manage the operation of pump 132 and/or other components of inflator device 120. It should be appreciated, however, that alternative configurations and connection of the internal components may be employed. A fluid conduit assembly includes a series of fluid lines 138a-c that are fluidly connected to fluid couplers or fluid tubes 157a-c extending through a lower side 126a of base 124 of housing 126 and into coupling portion 152 to fluidly connect various components of automatic inflator device 120 to the inlet valve assembly. Specifically, fluid line 138a and fluid tube 157a fluidly connect pump 132 to the inlet valve assembly, fluid line 138b and fluid tube 157b fluidly connect pressure sensor 136 to the inlet valve assembly, and fluid line 138c and fluid tube 157c provides a fluid passageway for purposes of relieving pressure from the inflatable object, where fluid line 138c and/or fluid tube 157c may be connected to a pressure relief mechanism or pressure relief valve 137. A series of air permeable water barriers, patches, or valves in the form of valves 156a-c, which may be made of a GORE® membrane material which is manufactured by W.L. Gore and Associates, Inc. of Newark, Delaware, block or prevent liquid water from entering housing 126, but allow air to pass into and out of housing 126, thus allowing pump 132 to pull air into housing 126 from the external environment, and allowing pressure relief valve 137 to facilitate the removal of air from housing 126 to the external environment. Valves 156a and 156b are located on lower side 126a of housing 126 to allow air to be exchanged directly between the external environment and housing 126. Valve 156c is located within coupling portion 152, such that air being exchanged between the inflatable object and pump 132, pressure sensor 136, pressure relief valve 137, and/or the interior of housing 126 must pass through valve 156c. As previously noted, in the illustrated embodiment valve 156c is a GORE® membrane, however, an alternative valve and/or membrane may be used to block water and allow air to pass into and out of housing 126. Valve 156c is protected by a protection member or plug 158 having a series of apertures to allow for the passage of air, and prevents moisture from inside the inflatable object from entry into housing 126. In addition, in like manner to automatic inflator device 20, automatic inflator device 120 further includes a microprocessor 135 and a GPS chip 139 that are electrically connected to control board 134; and a solar permeable panel 148 defined by a top surface 122a of top cover 122 that overlies solar panel 128.

Figure 18A:
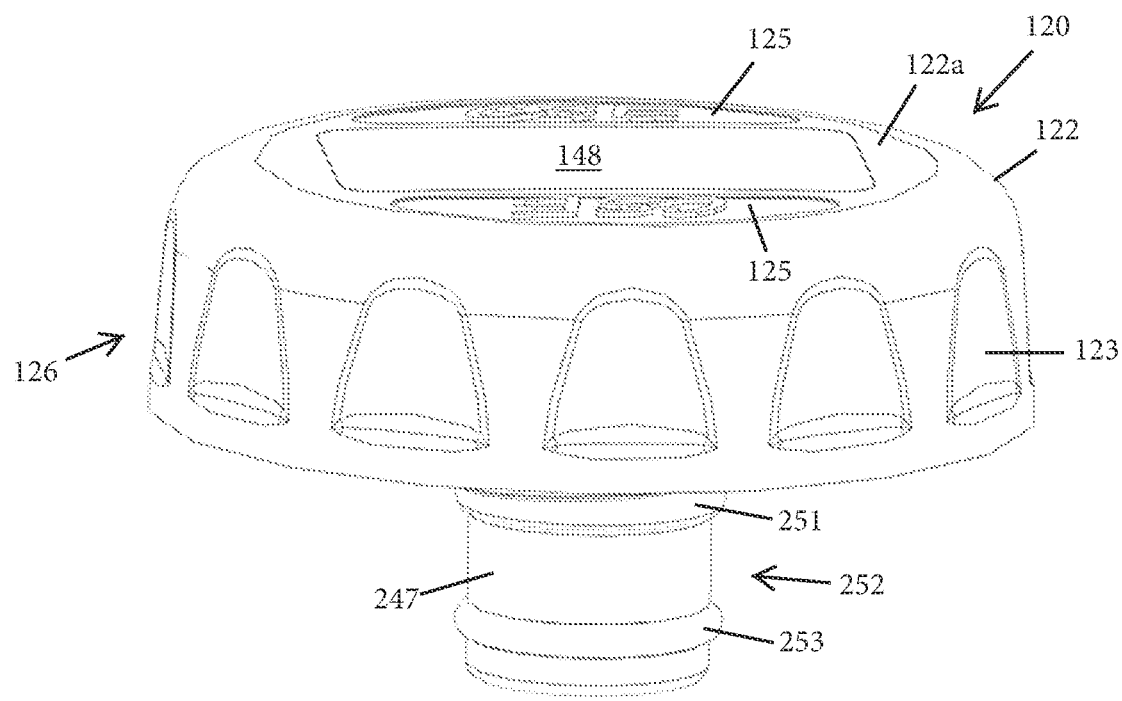
FIG. 18A is a side perspective view of the automatic inflator device of FIG. 9, in which another alternative base having an another alternative coupling portion is shown.
Figure 18B:
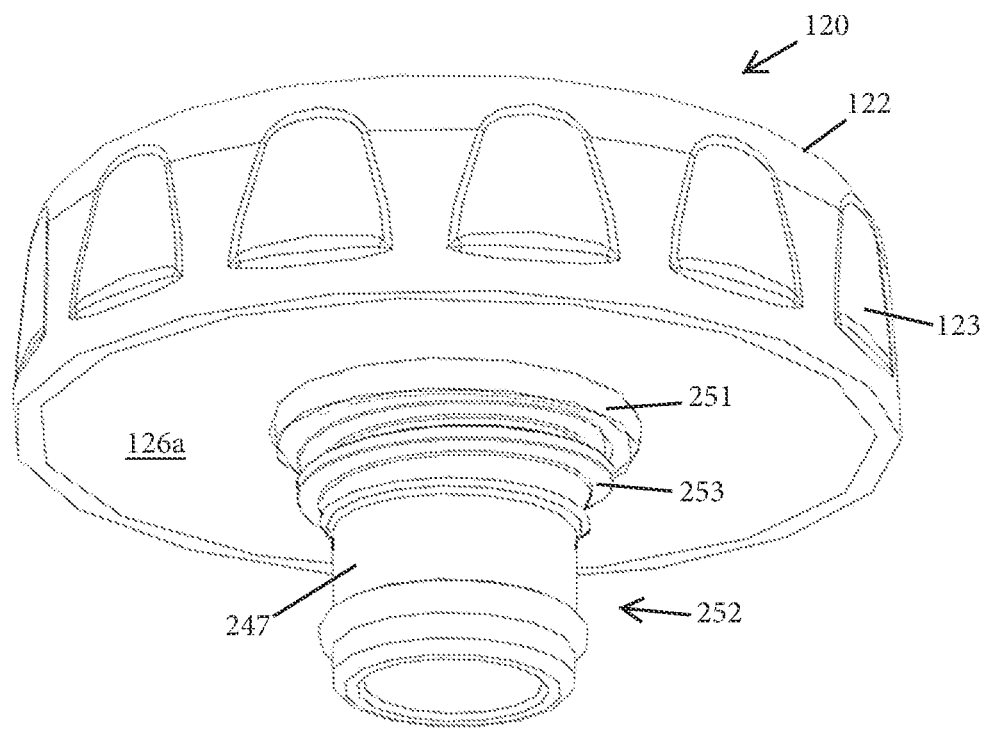
FIG. 18B is a lower perspective view of the automatic inflator device of FIG. 18A.
Figure 19A:
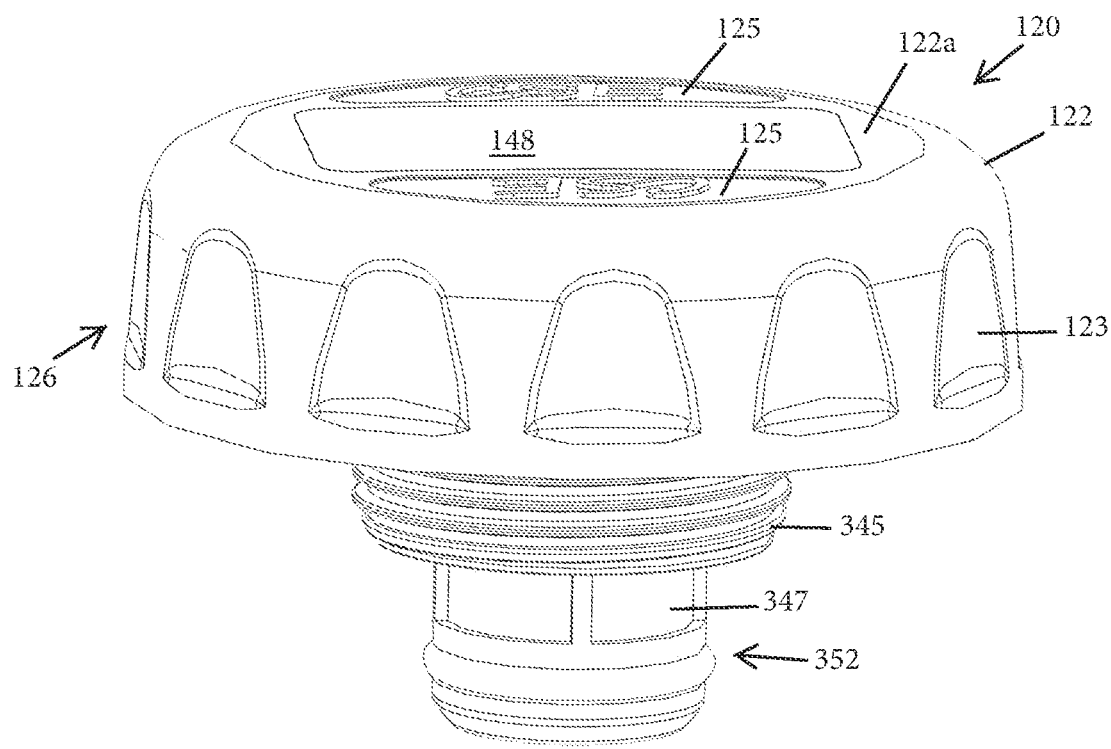
FIG. 19A is a side perspective view of the automatic inflator device of FIG. 9, in which yet another alternative base having another alternative coupling portion is shown.
Figure 19B:
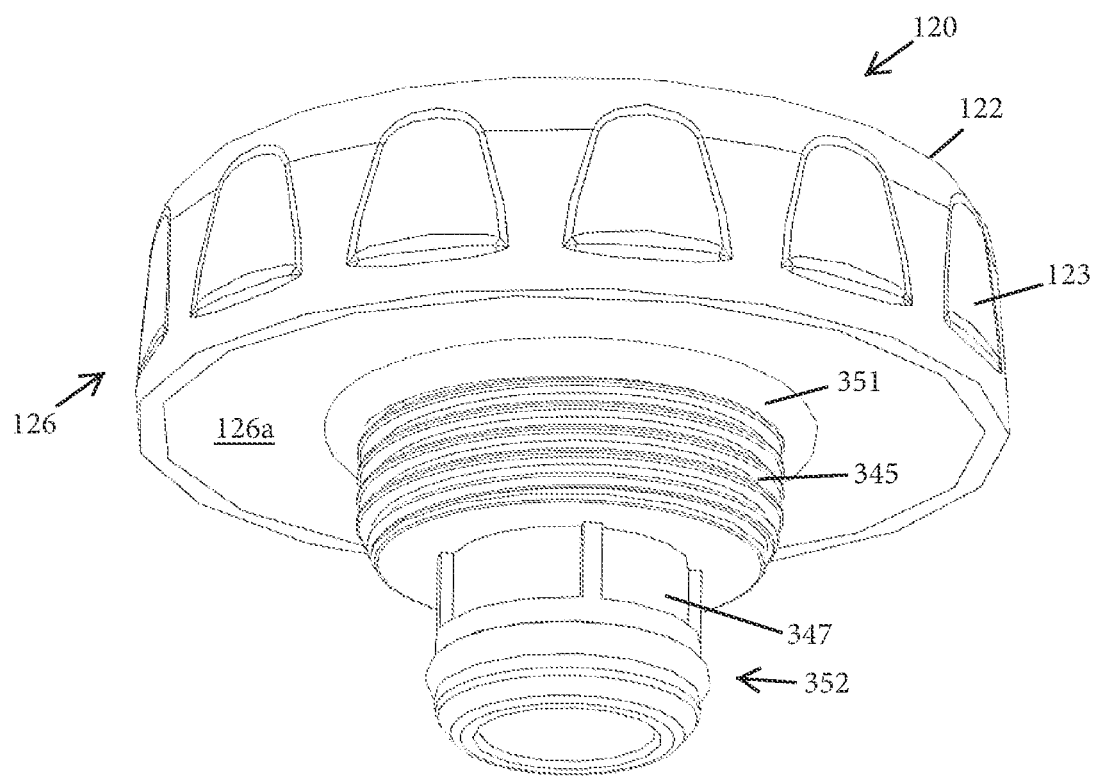
FIG. 19B is a lower perspective view of the automatic inflator device of FIG. 19A.

Automatic inflator device 120 may be configured with alternative bases having to alternative coupling portions for attachment to varying types of inlet valve assemblies. Referring to FIGS. 18A-18B, automatic inflator device 120 is shown with an alternative coupling portion 252 configured to mate with a LEAFIELD® valve, which is manufactured by Leafield Marine Limited Company located in Wiltshire, United Kingdom. Coupling portion 252 has a receiving portion 247 and a pair of sealing members in the form of a primary gasket 251 that is spaced-apart from a secondary gasket 253. Primary and secondary gaskets 251, 253 cooperate to form a water and air-tight connection when coupling portion 252 is coupled to the inlet valve assembly of the inflatable object. Referring to FIGS. 19A-19B, automatic inflator device 120 is shown with yet another alternative coupling portion 352 having a receiving end 347, external threads 345, and a sealing member or gasket 351, in which coupling portion 352 is configured to mate with a ZODIAC® valve, which is manufactured by Zodiac International, Société par actions simplifiée à associé unique located in Paris, France and/or Summerville, South Carolina.

Accordingly, the automatic inflator device of the present invention provides an easy and convenient way to inflate and/or maintain a desired level of inflation within an inflatable object. A housing contains operational components such as a power source, a pump, a pressure device, a pressure relief valve, a pressure sensor, and a control board. A coupling portion is attached to a lower base portion or lower side of the housing. A valve adaptor may be optionally coupled and added to the coupling portion. The automatic inflator device may be attached to an inlet valve assembly of the inflatable object via the coupling portion. The pump may then be energized by the power source to pump air into the inflatable object, thereby inflating the inflatable object. Optionally, many of the functions of the automatic inflator device may be controlled remotely with an electronic device, such as a mobile phone, tablet, or computer, by using a software application. It should be appreciated that an automatic inflator device may be configured to operate and/or be used with alternative valve and/or valve assembly designs or configurations produced by manufacturers varying from those noted above.

Changes and modifications in the specifically described embodiments may be carried out without departing from the principles of the present invention, which is intended to be limited only by the scope of the appended claims, as interpreted according to the principles of patent law including the doctrine of equivalents.

The invention claimed is:

1. An automatic inflator device for attachment to an inflatable water flotation object, said automatic inflator device comprising:
    a housing having a waterproof internal volume that houses a pressure sensor and a pump;
    a power source electrically coupled to said pump, wherein said power source comprises a solar panel disposed at said housing;
    said housing comprising a base and a coupler projecting outwardly at said base, wherein said coupler is configured to be inserted into an inlet valve assembly of the inflatable water flotation object to enable said inflator device to be coupled to the inflatable water flotation object such that said inflator device is mounted to the inflatable water flotation object; and
    a fluid conduit fluidly connected to said pump and configured to be operably coupled to an internal volume of the inflatable water flotation object via said coupler;
    wherein said pressure sensor is configured to detect air pressure within the inflatable water flotation object when said inflator device is mounted thereto, and wherein said pump is configured to be automatically selectively energized by said power source to move air through said fluid conduit and into the internal volume of the inflatable water flotation object based on the detected air pressure.

2. The automatic inflator device of claim 1, wherein said power source further comprises a rechargeable battery disposed within said housing, and wherein said solar panel is electrically coupled to said rechargeable battery.

3. The automatic inflator device of claim 1, wherein said coupler comprises one of (i) a cylindrical insertion end with slotted connectors for engaging with the inlet valve assembly of the inflatable water flotation object, (ii) a cylindrical insertion end for forming a press fit with the inlet valve assembly of the inflatable water flotation object, or (iii) a conical insertion end for forming a press fit with the inlet valve assembly of the inflatable water flotation object.

4. The automatic inflator device of claim 1, wherein said housing further comprises a valve, wherein said valve is configured to allow air to enter and exit said housing, and to prohibit water from entering said housing.

5. The automatic inflator device of claim 1, wherein said housing has an opening for said solar panel.

6. The automatic inflator device of claim 1, further comprising a control board that comprises a processor, and wherein said control board is electrically coupled to said pressure sensor, said power source and said pump, wherein said control board is configured to receive pressure signals from said pressure sensor and is configured to selectively energize and de-energize said pump based on input pressure signals received from said pressure sensor.

7. The automatic inflator device of claim 1, further comprising a pressure relief valve configured to reduce the internal air pressure of the inflatable water flotation object when the inflatable water flotation object is in an overinflated condition.

8. The automatic inflator device of claim 1, wherein said housing further comprises a top cover, and wherein said top cover is connected to said base to define said waterproof internal volume, and wherein said housing is buoyant.

9. An inflatable water flotation object with an integrated automatic inflator device comprising:
an inlet valve assembly through which air may be provided into an internal volume of the inflatable water flotation object;
a waterproof housing that houses a pressure sensor and a pump;
a power source electrically coupled to said pump, wherein said power source comprises a rechargeable battery and a solar panel, wherein said rechargeable battery is contained within said housing, and said solar panel is disposed at said housing;
a coupling portion disposed at a lower surface of said housing and coupled to said inlet valve assembly to operably fluidly couple said pump to said internal volume;
wherein said pressure sensor is configured to detect air pressure within said internal volume, and wherein said pump is configured to be automatically selectively energized by said rechargeable battery to inflate and/or manage inflation of the inflatable object based on the detected air pressure within said internal volume.

10. The inflatable water flotation object of claim 9, further comprising a control board that comprises a processor, wherein said control boarder is electrically coupled to said pressure sensor, said power source and said pump and selectively energizes and de-energizes said pump based on air pressure input signals from said pressure sensor.

11. The inflatable water flotation object of claim 10, wherein said control board comprises a global positioning system circuit.

12. The inflatable water flotation object of claim 9, wherein said control board is configured to receive a wireless command from an electronic computer device to selectively energize and de-energize said pump.

13. The inflatable water flotation object of claim 9, wherein said coupling portion comprises a coupler projecting outwardly from said lower surface, and wherein said coupler extends into said inlet valve assembly.

14. The inflatable water flotation object of claim 9, wherein said control board is configured to wirelessly transmit the detected air pressure of said internal volume.

15. The inflatable water flotation object of claim 9, wherein said housing includes an opening for said solar panel.

16. The inflatable water flotation object of claim 15, wherein said housing comprises a solar-permeable panel that overlies said solar panel at said opening.

17. An automatic inflator device for inflating an inflatable water flotation object, said automatic inflator device comprising:
a waterproof housing comprising a solar permeable panel, and housing:
a solar panel that underlies said solar permeable panel;
a pressure sensor;
a pump; and
a rechargeable battery that is electrically coupled to said solar panel and said pump;
a coupler extending from said housing; and
wherein said coupler is configured to be inserted into an inlet valve assembly of the inflatable water flotation object to fluidly connect said pump to an internal volume of the inflatable water flotation object; and
wherein said pressure sensor is configured to detect air pressure within the inflatable water flotation object when said inflator device is mounted thereto, and wherein said pump is configured to be automatically selectively energized by said rechargeable battery to move air through said coupler and into the internal volume of the inflatable water flotation object.

18. The automatic inflator device of claim 17, further comprising a control board that comprises a processor, and wherein said control board is electrically coupled to said pressure sensor, said rechargeable battery and said pump, wherein said control board is configured to receive pressure signals from said pressure sensor and is configured to selectively energize and de-energize said pump based on input pressure signals received from said pressure sensor.

19. The automatic inflator device of claim 18, further comprising an air permeable water barrier at said housing, wherein said air permeable water barrier is configured to allow air to enter and exit said housing, and to prohibit water from entering said housing.

20. The automatic inflator device of claim 19, further comprising a first fluid line extending from said pump to the inlet valve assembly and a second fluid line extending from said pressure sensor to the inlet valve assembly.

\* \* \* \* \*

UNITED STATES PATENT AND TRADEMARK OFFICE
CERTIFICATE OF CORRECTION

| | | |
|---|---|---|
| PATENT NO. | : 12,007,795 B2 | Page 1 of 1 |
| APPLICATION NO. | : 17/860646 | |
| DATED | : June 11, 2024 | |
| INVENTOR(S) | : Gregory A. Miedema | |

It is certified that error appears in the above-identified patent and that said Letters Patent is hereby corrected as shown below:

In the Specification

Column 8:
Line 56, insert --.-- after "Florida"

In the Claims

Column 11:
Line 58, "boarder" should be --board--

Signed and Sealed this
Thirteenth Day of August, 2024

Katherine Kelly Vidal
*Director of the United States Patent and Trademark Office*